(12) United States Patent
Tamune

(10) Patent No.: US 6,940,556 B1
(45) Date of Patent: Sep. 6, 2005

(54) ELECTRONIC STILL CAMERA AND INFORMATION RECORDING APPARTUS

(75) Inventor: Michihiro Tamune, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/291,936

(22) Filed: Apr. 15, 1999

(30) Foreign Application Priority Data

Apr. 16, 1998 (JP) .................................. 10-106548

(51) Int. Cl.$^7$ ........................... H04N 9/73; H04N 9/07; H04N 5/232; H04N 5/202; G03B 13/00

(52) U.S. Cl. ................... 348/350; 348/254; 348/223.1; 348/267

(58) Field of Search ............................ 348/267, 223.1, 348/350, 254

(56) References Cited

U.S. PATENT DOCUMENTS

| | | | | |
|---|---|---|---|---|
| 4,623,932 A | * | 11/1986 | Inoue et al. ................ | 348/350 |
| 4,647,979 A | * | 3/1987 | Urata .......................... | 348/352 |
| 4,887,121 A | * | 12/1989 | Pritchard .................... | 396/225 |
| 5,262,867 A | * | 11/1993 | Kojima ........................ | 348/39 |
| 5,434,640 A | * | 7/1995 | Takagi et al. ............... | 396/234 |
| 5,438,363 A | * | 8/1995 | Ejima et al. ............. | 348/223.1 |
| 5,523,785 A | * | 6/1996 | Muramoto .................. | 348/254 |
| 5,602,412 A | * | 2/1997 | Suzuki et al. ............... | 257/432 |
| 5,625,434 A | * | 4/1997 | Iwane .......................... | 396/95 |
| 5,808,681 A | * | 9/1998 | Kitajima ..................... | 348/371 |
| 5,995,144 A | * | 11/1999 | Sasakura .................... | 348/350 |
| 6,072,526 A | * | 6/2000 | Hashimoto et al. ...... | 348/223.1 |
| 6,157,781 A | * | 12/2000 | Konno et al. ................ | 396/71 |
| 6,160,581 A | * | 12/2000 | Higashihara et al. ....... | 348/364 |

* cited by examiner

*Primary Examiner*—Wendy R. Garber
*Assistant Examiner*—James M. Hannett
(74) *Attorney, Agent, or Firm*—Oliff & Berridge, PLC

(57) ABSTRACT

An electronic still camera is provided with a photographic image capturing device that outputs image data by capturing a subject image passing through a taking lens, an analytic image capturing device provided at a position adjacent to the position that is conjugate with the photographic image capturing device relative to the taking lens that receives light forming the subject image and outputs image data for scene analysis, an analyzing circuit that performs scene analysis of the subject image based upon the image data for scene analysis output by the analytic image capturing device and an image processing circuit that performs image processing based upon the results of the scene analysis output by the analyzing circuit. The gradation curve, and the R gain and the B gain for white balance adjustment are determined based upon the results of the scene analysis using the image data for scene analysis output by the image capturing device for scene analysis provided separately from the photographic image capturing device.

12 Claims, 10 Drawing Sheets

HALFTONE PREFERENCE TYPE

HIGHLIGHT PREFERENCE TYPE

SHADOW PREFERENCE TYPE

HIGHLIGHT-SHADOW PREFERENCE TYPE

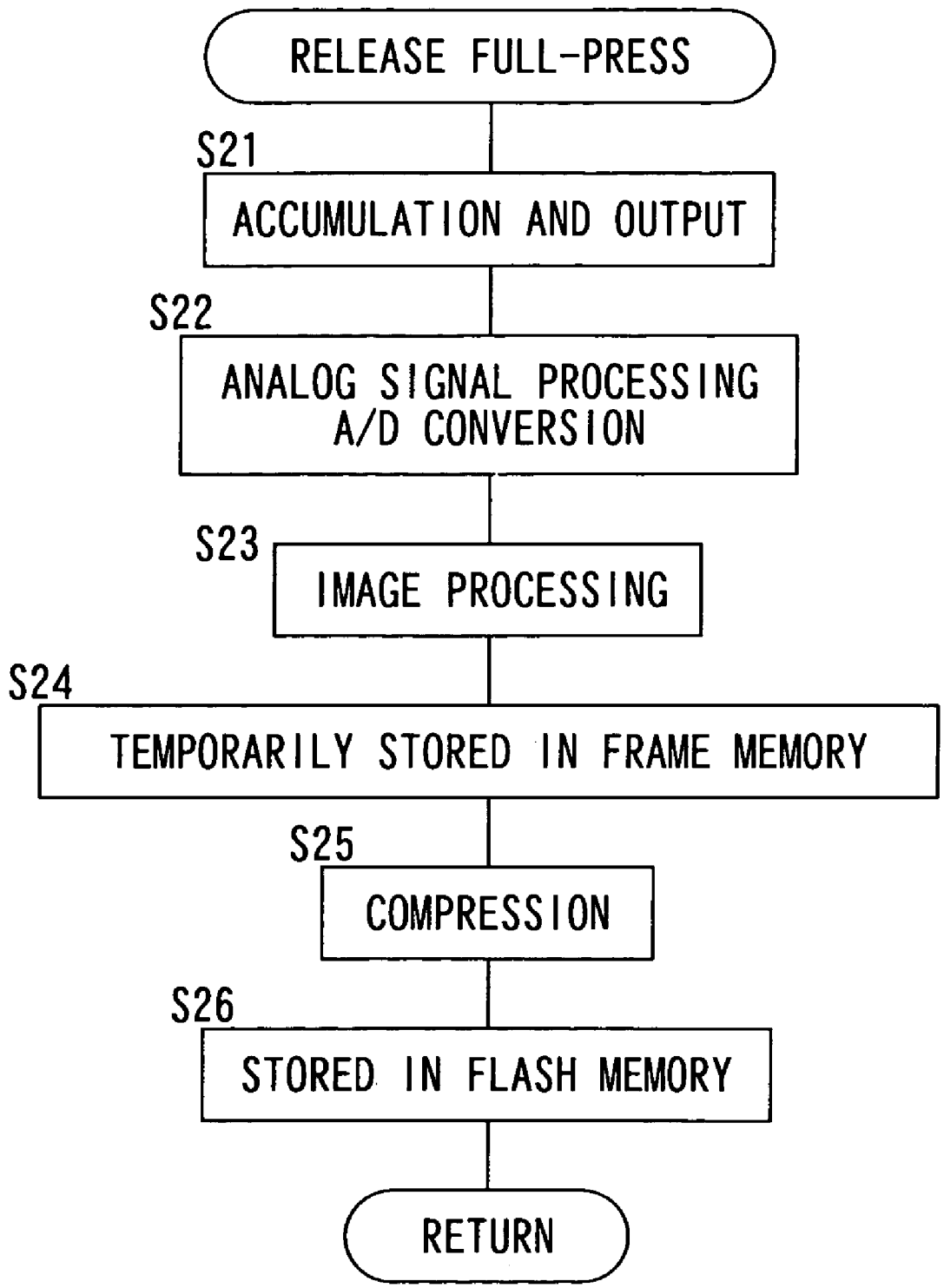

ELECTRONIC STILL CAMERA AND INFORMATION RECORDING APPARTUS

INCORPORATION BY REFERENCE

The disclosure of the following priority application is herein incorporated by reference:

Japanese Patent Application No. 10-106548, filed Apr. 16, 1998

BACKGROUND OF THE INVENTION

1. Field of the Invention

The present invention relates to an electronic still camera and an information recording apparatus that record a subject as electronic image data.

2. Description of the Related Art

There are single lens reflex type electronic still cameras in the prior art. A single lens reflex type electronic still camera is provided with a viewfinder device to which a subject image passing through a taking lens is guided by a quick return mirror, an image capturing device such as a CCD that is provided at a stage to the rear of the quick return mirror to capture the subject image and output image data, an image processing circuit that performs image processing such as white balance adjustment and γ control on the image data output by the image capturing device, a compression circuit that compresses data having undergone image processing by adopting a method such as JPEG to store them in a storage medium such as a flash memory and a monitor that displays data that has undergone the image processing. In the image processing circuit, based upon the image data output by the image capturing device, parameters including the R gain and the B gain for white balance adjustment or the gradation curve for γ control using a preset algorithm are calculated.

In such a single lens reflex type electronic still camera, the number of pixels at the image capturing device has been steadily increasing over the years to exceed a million or even two million pixels, resulting in a tendency for a longer period of time required for image processing. In particular, when calculating the gradation curve for γ control to achieve high quality image processing, a significant length of time is required for the analysis of a photographic scene. In addition, a large-scale, complex image processing circuit is required. Moreover, the length of time required for calculating the R gain and the B gain for white balance adjustment also increases when the number of pixels at the image capturing device becomes large. It is to be noted that these problems may likewise occur in various other types of electronic still cameras having an image capturing device with the number of pixels exceeding 1~2 million.

SUMMARY OF THE INVENTION

An object of the present invention is to provide an electronic still camera and an information recording apparatus that are capable of reducing the length of time required for image processing which is implemented by analyzing the photographic scene.

In order to achieve the object described above, the electronic still camera according to the present invention comprises a photographic image capturing device that outputs image data by capturing a subject image passing through a taking lens, an analytic image capturing device provided at a position adjacent to the position that is conjugate with the photographic image capturing device relative to the taking lens, that receives the subject image and outputs image data for scene analysis, an analyzing circuit that performs scene analysis of the subject image based upon the image data for scene analysis output by the analytic image capturing device and an image processing circuit that performs image processing on the image data output by the photographic image capturing device based upon the results of the scene analysis output by the analyzing circuit.

It is desirable that the number of pixels at the analytic image capturing device be smaller than the number of pixels at the photographic image capturing device.

The analyzing circuit is capable of calculating parameters such as coefficients and gains to support various types of image processing performed by the image processing circuit.

The analytic image capturing device may be divided into a plurality of areas each having a plurality of pixels which receive light forming the subject image so that the analyzing circuit can calculate the parameters based upon image data for scene analysis output from the plurality of areas.

The analyzing circuit is capable of calculating a gradation (γ) curve based upon the brightness value indicated by the image data for scene analysis, and the image processing circuit is capable of correcting photographic image data based upon the gradation curve. In this case, too, the analytic image capturing device may be divided into a plurality of areas so that the analyzing circuit can calculate the gradation curve based upon image data for scene analysis output from the plurality of areas.

The image data for scene analysis output by the analytic image capturing device contain RGB signals, the analyzing circuit calculates the gains for white balance adjustment based upon the RGB signals and the image processing circuit corrects the photographic image data based upon the gains for white balance adjustment.

The parameters mentioned above may be calculated at the image processing circuit instead of at the analyzing circuit. In this case, the image processing circuit calculates parameters such as coefficients and gains to be used in various types of image processing based upon the image data corresponding to, at least, a specific area among the photographic image data output by the photographic image capturing device, and the analyzing circuit determines the specific area based upon the results of the scene analysis.

The present invention may be adopted in a single lens reflex type electronic still camera. Namely, a single lens reflex type electronic still camera according to the present invention comprises a viewfinder device to which a subject image passing through a taking lens is guided by a quick return mirror, a photographic image capturing device provided at a stage to the rear of the quick return mirror that outputs image data by capturing the subject image, an analytic image capturing device provided at the position adjacent to the position which is conjugate with the photographic image capturing device relative to the taking lens, that receives the subject image guided to the viewfinder device and outputs image data for scene analysis, an arithmetic operation circuit to which the image data for scene analysis output by the analytic image capturing device are input so that it can calculate in advance parameters such as coefficients and gains to be used for image processing and an image processing circuit that performs image processing on the image data output by the photographic image capturing device by using the parameters calculated at the arithmetic operation circuit.

In the single lens reflex type electronic still camera, too, the parameters mentioned earlier may be calculated at the image processing circuit instead of at the analyzing circuit. Namely, such a single lens reflex type electronic still camera should be provided with an image processing circuit that calculates parameters such as coefficients and gains to be used for various types of image processing based upon image data corresponding to, at least, a specific area among photographic image data output by the photographic image capturing device and performs image processing on the photographic image data using these parameters and an analyzing circuit that performs scene analysis of the subject image based upon the image data for scene analysis output by the analytic image capturing device and determines the specific area based upon the results of the analysis.

The information recording apparatus according to the present invention comprises, at least, a first image capturing device and a second image capturing device that output image data by capturing a subject image passing through a taking lens, an analyzing circuit that performs scene analysis on the subject image by using the image data output by, at least, either the first image capturing device or the second image capturing device, an analyzing circuit that performs scene analysis of the subject image by using the image data output by, at least, either the first image capturing device or the second image capturing device and an image processing circuit that performs image processing on the image data output by, at least, either the first image capturing device or the second image capturing device based upon the results of the scene analysis performed by the analyzing circuit.

It is desirable that the first and second image capturing devices have different numbers of pixels from each other and that image data output by the image capturing device having the smaller number of pixels be input to the analyzing circuit.

The analyzing circuit is capable of calculating parameters such as coefficients and gains for various types of image processing to be performed at the image processing circuit.

It is desirable that the image capturing device to be employed for scene analysis be divided into a plurality of areas so that the analyzing circuit can perform scene analysis based upon image data for scene analysis output from the plurality of areas. A plurality of pixels are provided in each divisional area.

The analyzing circuit is capable of calculating a gradation ($\gamma$) curve based upon the brightness value indicated by the image data for scene analysis, and the image processing circuit is capable of correcting the photographic image data based upon the gradation curve.

The image capturing device employed for scene analysis may be divided into a plurality of areas. Each area has a plurality of pixels receiving the subject image light. The analyzing circuit is capable of calculating the gradation curve based upon image data for scene analysis output from the plurality of areas.

The image data for scene analysis output by the image capturing device employed for scene analysis contain RGB signals, the analyzing circuit calculates the gains for white balance adjustment based upon the RGB signals and the image processing circuit is capable of correcting the photographic image data based upon the gains for white balance adjustment.

Alternatively, the image processing circuit may calculate parameters such as coefficients and gains to be used for various types of image processing based upon image data corresponding to, at least, a specific area among the photographic image data output by the image capturing device employed for photographing and the analyzing circuit may determines the specific area based upon the results of the scene analysis.

BRIEF DESCRIPTION OF THE DRAWINGS

FIG. 7 is a flowchart illustrating a program that is started up with a full-press switch;

DETAILED DESCRIPTION OF THE PREFERRED EMBODIMENTS

Figure 1:
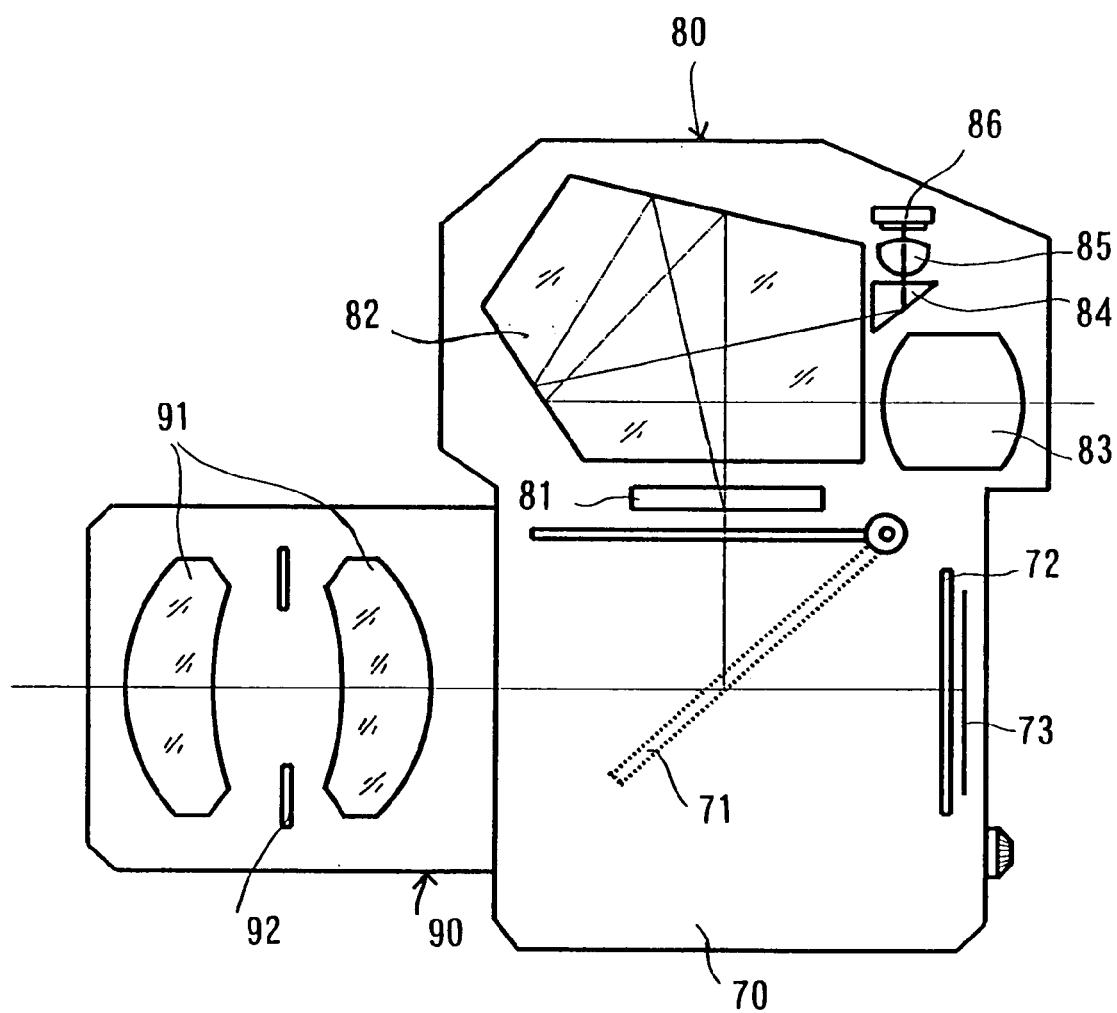
FIG. 1 illustrates the structure of a single lens reflex type electronic still camera in an embodiment of the present invention.

The following is an explanation of the embodiments of the present invention given in reference to the drawings. As illustrated in FIG. 1, the single lens reflex type electronic still camera in this embodiment is provided with a camera main body 70, a viewfinder device 80 that may be attached to and detached from the camera main body 70 and an interchangeable lens 90 provided with an internal taking lens 91 and an internal aperture 92, that may be attached to and detached from the main body 70. Subject light travels through the interchangeable lens 90 to enter the camera main body 70, is led to the viewfinder device 80 by a quick return mirror 71 which is at the position indicated by the dotted line before a shutter release operation and an image is formed at a viewfinder mat 81. This subject image is further guided to an ocular lens 83 by a pentaprism 82. In addition, the subject image passes from the pentaprism 82 to a prism 84 and an optical element 85 and is formed on the photosensitive surface of an image capturing device for scene analysis 86. After a shutter release operation, on the other hand, the quick return mirror 71 rotates to the position indicated by the solid line and the subject light travels via an aperture 72 to form an image on an image capturing device for photographing 73. The image capturing device for scene analysis 86 is provided at a position adjacent to the position that is conjugate with the image capturing device for photographing 73 relative to the taking lens 91.

Figure 2:
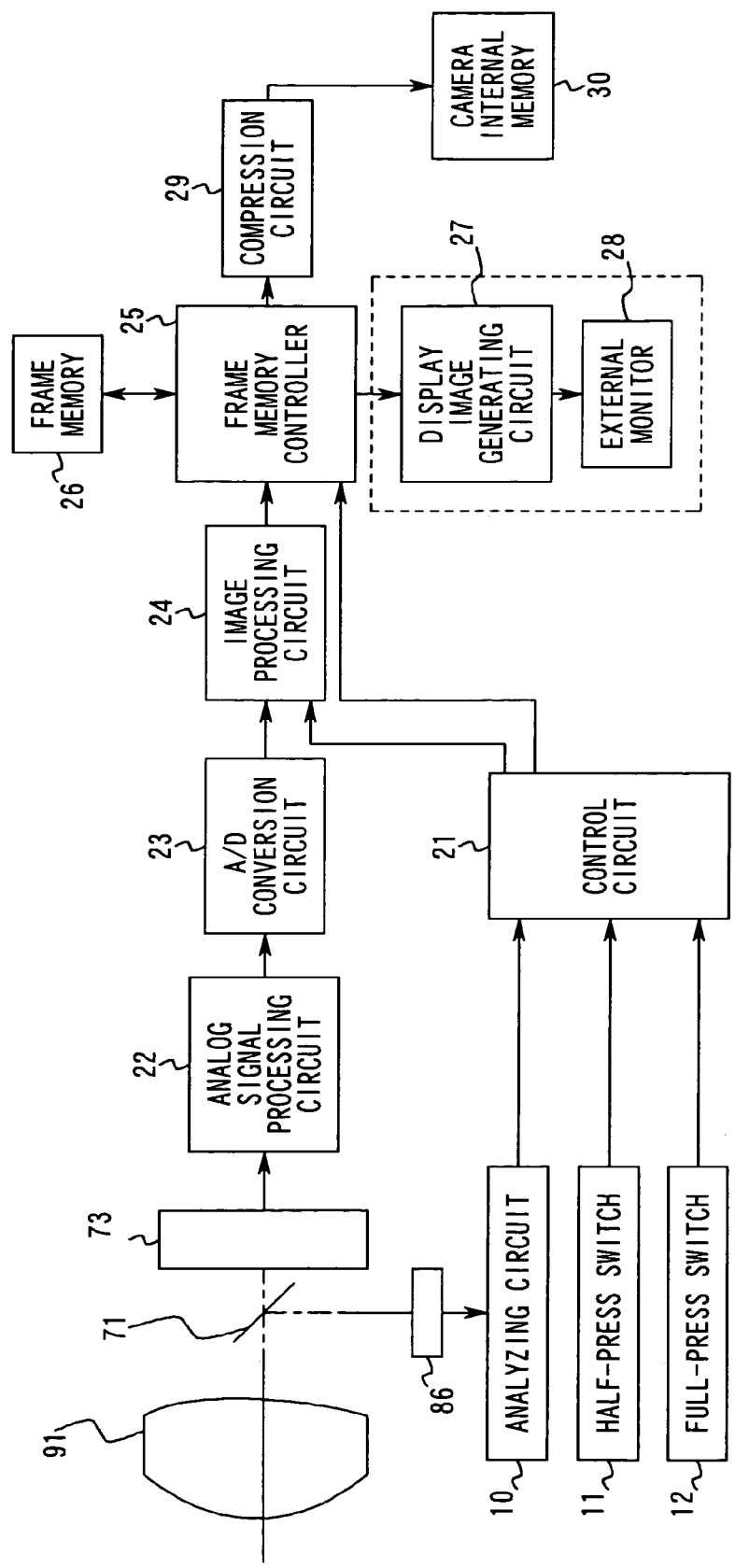
FIG. 2 is a block diagram of one embodiment of the signal processing system in the single lens reflex type electronic still camera.

FIG. 2 is a circuit block diagram of the embodiment. When a half-press switch 11 is operated, the analytic image capturing device 86 starts an electrical charge storage or accumulation, and when the accumulation ends, the analytic image capturing device 86 outputs RGB image data for scene analysis to an analyzing circuit 10. The analyzing circuit 10 converts the image data to a digital signal, and performs scene analysis of a photographic scene based upon the digital image signal. The results of the analysis are transferred to an image data control circuit 21.

If, on the other hand, a full-press switch 12 is operated, the quick return mirror rotates upward, the subject light from the interchangeable lens 90 forms an image on the photosensitive surface of the photographic image capturing device 73 and a signal electrical charge corresponding to the brightness of the subject image is accumulated at the photographic image capturing device 73. The signal electrical charge accumulated at the photographic image capturing device 73 undergoes analog processing such as gain control at an analog signal processing circuit 22, and then it is converted to a digital signal at an A/D conversion circuit 23. The signal that has undergone the digital conversion is then supplied to an image processing circuit 24 where it undergoes image processing such as white balance adjustment, contour compensation and γ control to become formatted, and it travels through a frame memory controller 25 to be temporarily stored at a frame memory 26. The various parameters used in the image processing performed by the image processing circuit 24 are calculated in advance at the scene analyzing circuit 10 and are stored within the memory in the control circuit 21.

The image data stored in the frame memory 26 are processed into image data for display by a display image generating circuit 27 and are displayed on an external monitor 28 such as an LCD as the photographic results. In addition, the image data stored in the frame memory 26 undergo data compression at a specific ratio through a method such as JPEG at a compression circuit 29 and are recorded in a camera internal memory (storage medium) 30 such as a flash memory.

Figure 3:
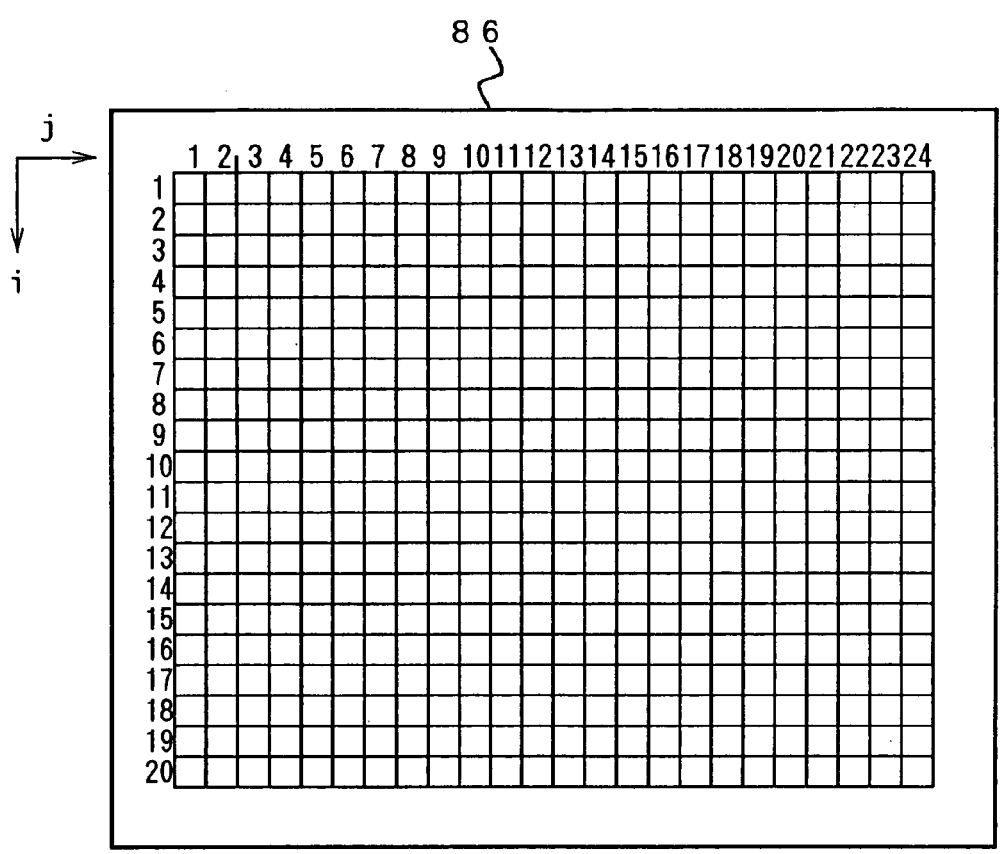
FIG. 3 presents an example of the image capturing device for scene analysis.
Figure 4:
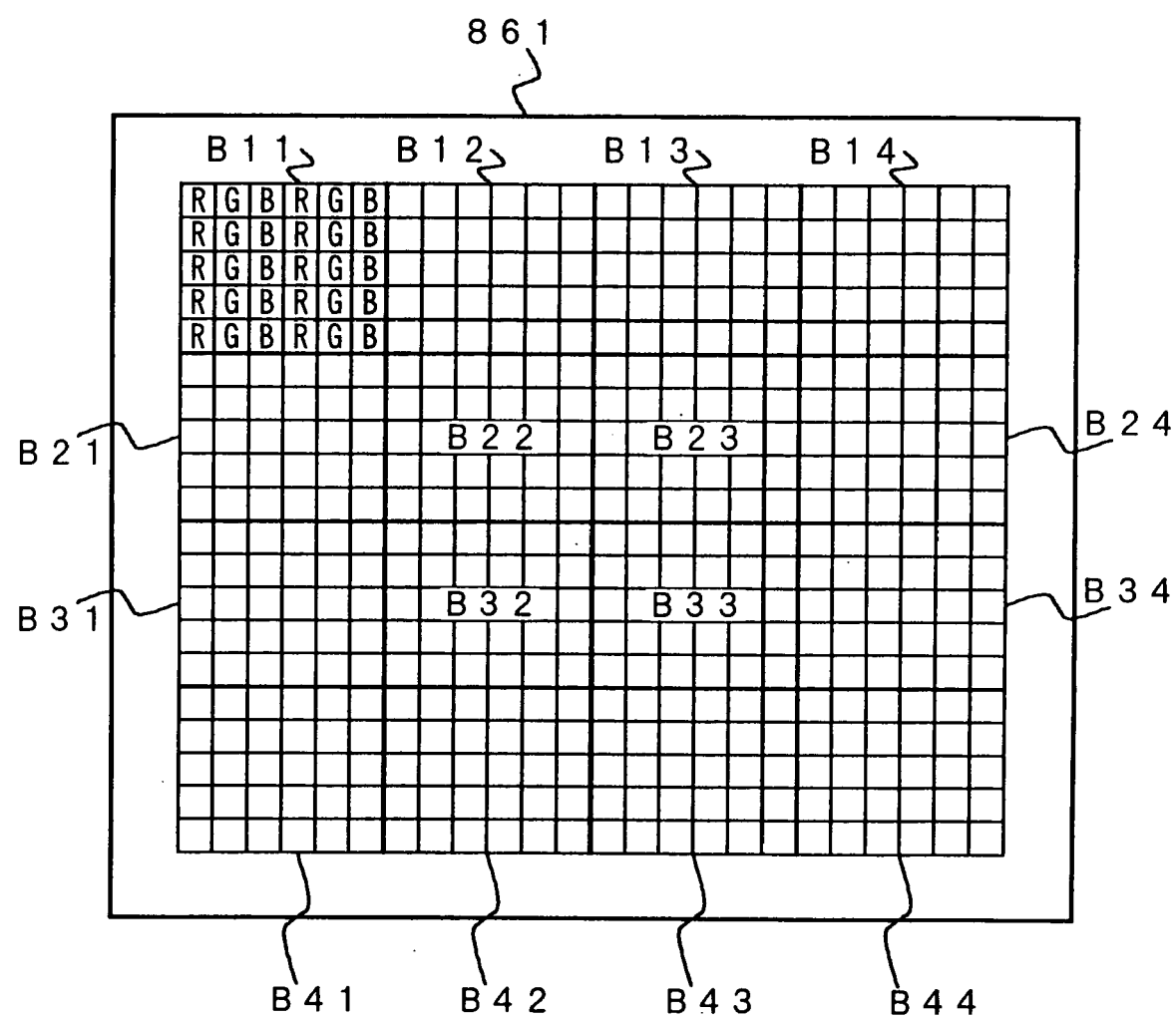
FIG. 4 illustrates the color filter in the image capturing device for scene analysts and also presents an example in which grouping into 16 blocks is implemented.

Next, a detailed explanation is given on the image capturing device for scene analysis 86 and the scene analyzing circuit 10. The image capturing device for scene analysis 86 may be constituted of, for instance, a single two-dimensional CCD having 480 separate pixels provided over 24 columns (across)×20 rows (down) as illustrated in FIG. 3. On the front surface of the image capturing device 86, an RGB color filter 861 which is divided into a total of 480 blocks over 24 columns (across)×20 rows (down) in correspondence to the 480 pixels, as illustrated in FIG. 4, is provided. The 480-block RGB filter is grouped into 16 blocks; B11, B12 . . . B43 and B44 each having 6 columns (across)×5 rows (down) filter elements, to be utilized for scene analysis. The image capturing device 86 is divided into 16 areas each having 30 pixels. In this context, scene analysis refers to an analysis related to the information on the brightness of the photographic scene, the RGB signal distribution state and the like.

Figure 5:
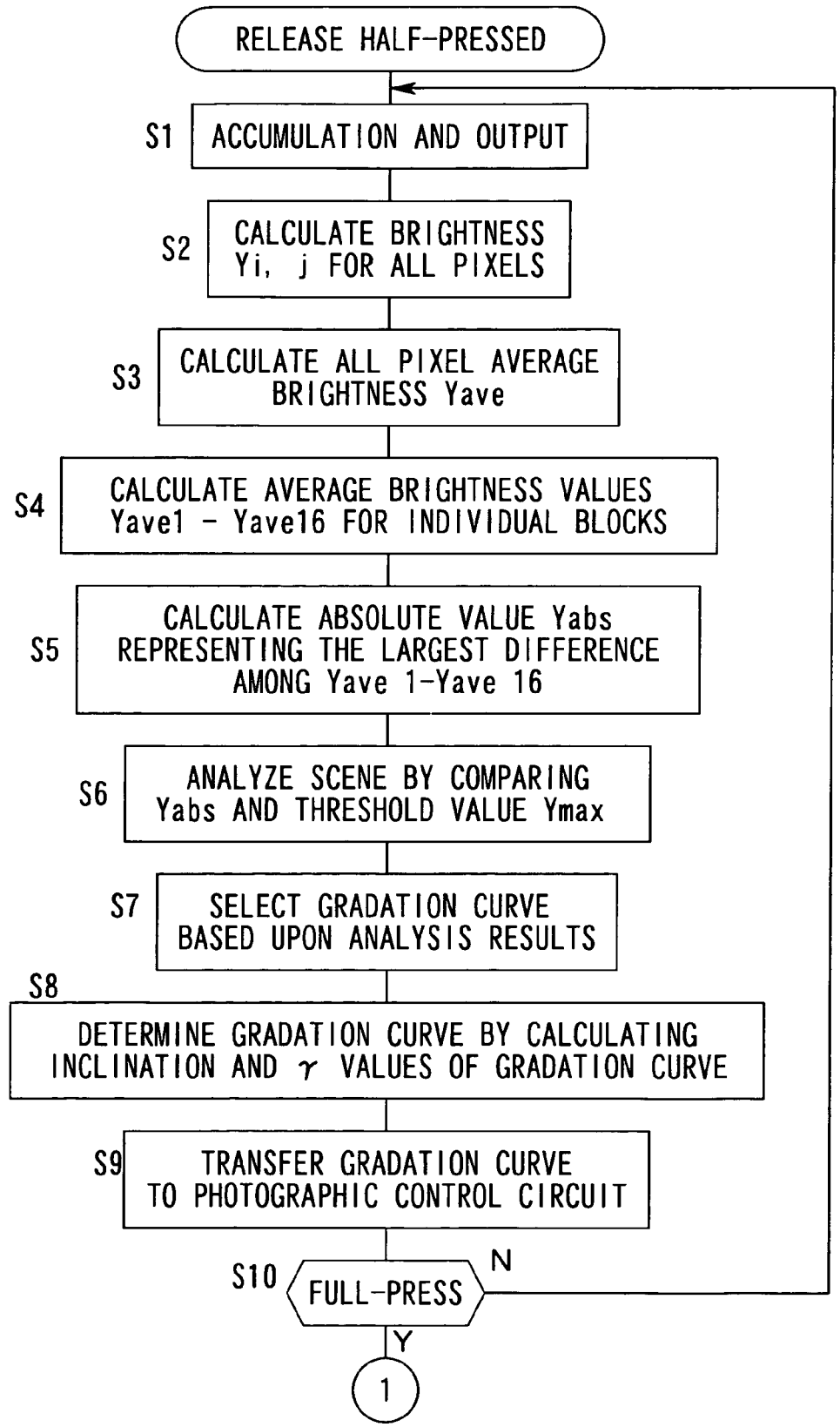
FIG. 5 is a flowchart illustrating a program that is started up with a half-press switch.

Next, the procedure through which the gradation curve is determined by analyzing a scene is explained in reference to FIGS. 5~7. When the half-press switch 11 is operated, the program illustrated in FIG. 5 is started up, and in step S1, the image capturing device for scene analysis 86 accumulates an electrical charge achieved by the subject light with its image formed on the photosensitive surface of the image capturing device for scene analysis 86 over a specific length of time before sequentially outputting the accumulated RGB image data to the scene analyzing circuit 10. In step S2, the brightness value Yij (i=1~20, j=1~24) for each of the 480 pixels is calculated, and in step S3, the full average value Yave is calculated. In step S4, a block average brightness value Yave 1~Yave 16 for the 16 individual blocks B11~B44 are calculated. Then the operation advances to step S5 in which the differences among the block average brightness values Yave 1~Yave 16 are calculated and the absolute value Yabs of the largest brightness difference is calculated. In step S6, the absolute value Yabs and a preset threshold value Ymax are compared with each other to perform scene analysis. Then, in step S7, a decision is made with respect to which of the four gradation curves prepared in advance as illustrated in FIGS. 6A~6D is to be used based upon the results of the scene analysis as explained below.

Figure 6A:
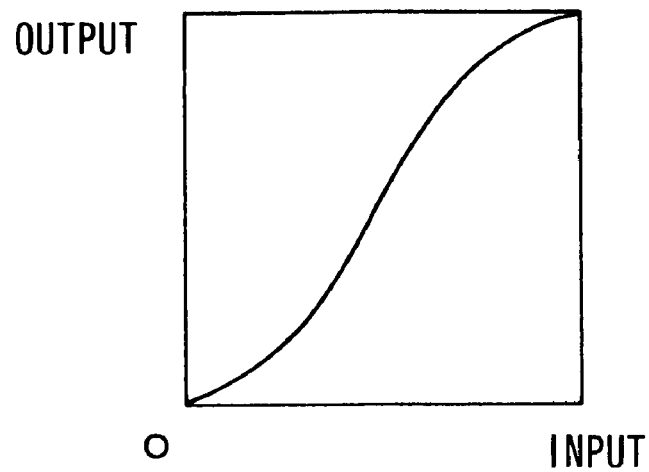
FIGS. 6A–6D illustrate gradation curves.

(1) If the absolute value Yabs of the largest brightness difference is smaller than the preset threshold value Ymax, the photographic scene is determined to be a halftone preference type. In the case of the halftone preference type, the S-shaped gradation correction curve illustrated in FIG. 6A is used. This assures a halftone gradation.

(2) When the absolute value Yabs of the largest brightness difference is equal to or larger than the preset threshold value Ymax, the difference Ydiff(i) between the full pixel average brightness Yave and the average brightness Yave(i) in each block is calculated as follows.

$$Ydiff(i)=Yave-Yave(i) \qquad (1)$$

Here, i represents an integer within the range of 1~16.

A check is performed to ascertain whether or not there are a plurality of contiguous blocks in each of which Ydiff(i) is smaller than a preset threshold value Yhilight or there are a plurality of contiguous blocks in which Ydiff(i) is larger than a preset threshold value Yshadow, and based upon the results of the check, the scene is analyzed, as described below. It is to be noted that; threshold value Yhilight<threshold value Yshadow.

Figure 6B:
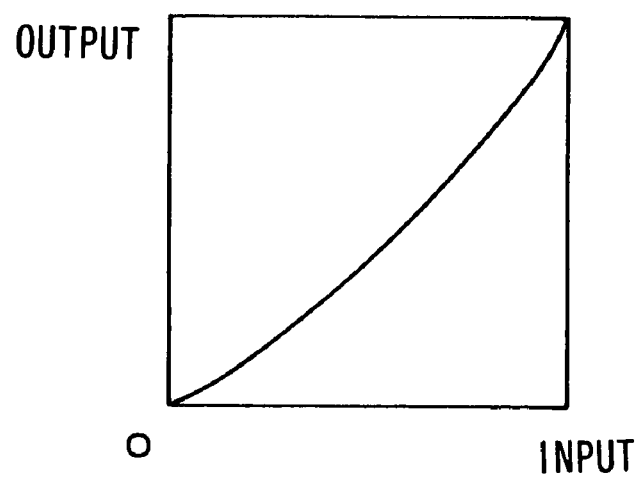

(2-1) If there are a plurality of contiguous blocks for each of which Ydiff(i) is smaller than the threshold value Yhilight, the scene is determined to be the heighlight preference type. In the case of the heighlight preference type, the gradation correction curve illustrated in FIG. 6B is used. This assures gradation from halftone through highlight.

Figure 6C:
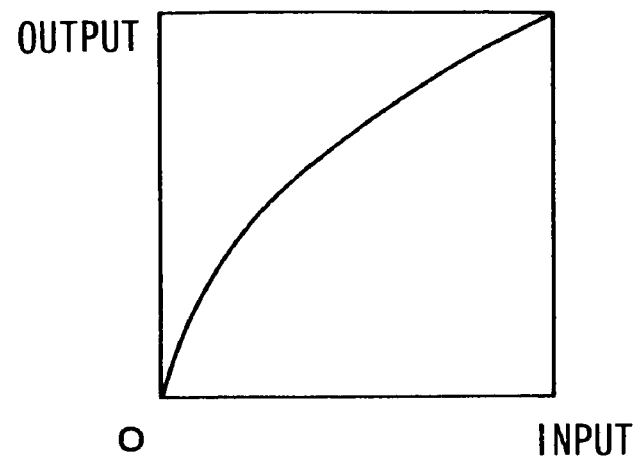

(2-2) If there are a plurality of contiguous blocks in each of which Ydiff(i) is larger than the threshold value Yshadow, the scene is determined to be the shadow preference type. In the case of the shadow preference type, the gradation correction curve illustrated in FIG. 6C is used. This assures gradation from shadow through halftone.

Figure 6D:
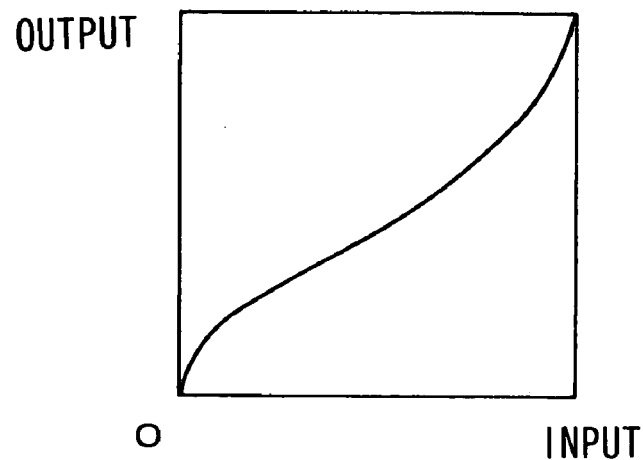

(2-3) If there are a plurality of contiguous blocks for each of which Ydiff(i) is smaller than the threshold value Yhilight and there are a plurality of contiguous blocks for each of which the Ydiff(i) is larger than the threshold value Yshadow, the scene is determined to be the highlight-shadow preference type. In the case of the highlight-shadow preference type, the gradation correction curve illustrated in FIG. 6D is used. This assures gradation in the shadow area and the highlight area.

Then, in step S8, the pitches or inclinations and the γ values of the individual gradation curves are calculated by using the full brightness average value Yave, the block average brightness values Yave 1~Yave 16 and Ydiff(i), and the ultimate gradation curve is determined using these data. In step S9, the gradation curve thus calculated is transferred to the photographic control circuit 21. The control circuit 21 then stores the gradation curve in its memory. The operations in steps S1~S9 described above are repeated until the full-press button is operated in step S10.

When the full-press button 12 is operated, the quick return mirror swings upward and the program with the photographing sequence illustrated in FIG. 7 is started up. In step S21, a light reception signal is accumulated at each pixel in the image capturing device 73, and when the accumulation is completed, the accumulated electrical charges at all the pixels are sequentially output. In step S22, the image data thus output are processed at the analog signal processing circuit 22, and are then converted to digital image data at the AD conversion circuit 23 before they are input to the image processing circuit 24. Next, the operation proceeds to step S23, in which the image data undergo gradation correction by using a gradation curve calculated in advance at the scene analyzing circuit 10 and stored in memory. It is to be noted that the image processing circuit 24 also engages in white balance adjustment and the like. When the image processing is completed, the operation proceeds to step S24, in which the image data that have undergone image processing are temporarily stored in the frame memory 26. In step S25, the image data are compressed at the compression circuit 29 through the JPEG method, and then, in step S26, the compressed image data are stored in the storage medium 30.

As explained above, when the half-press switch 11 is operated, the scene analyzing circuit 10 calculates the gradation curve which is then transferred to the control circuit 22 to be stored in its memory in this embodiment. The calculation for the gradation curve is executed repeatedly while the half-press switch 11 is being operated, and the memory contents are overwritten with the latest data. Then, when the full-press switch 12 is operated and an image is formed of the subject light at the photographic image capturing device 73, the image capturing device 73 accumulates electrical charges achieved by the subject light over a specific length of time and then outputs them sequentially. Since the image processing circuit 24 performs the gradation correction using the gradation curves that are stored in memory in advance, it is not necessary to calculate the gradation curve using the photographic image data themselves, whose volume is very large, so that the length of time required for gradation correction processing can be reduced.

Figure 8:
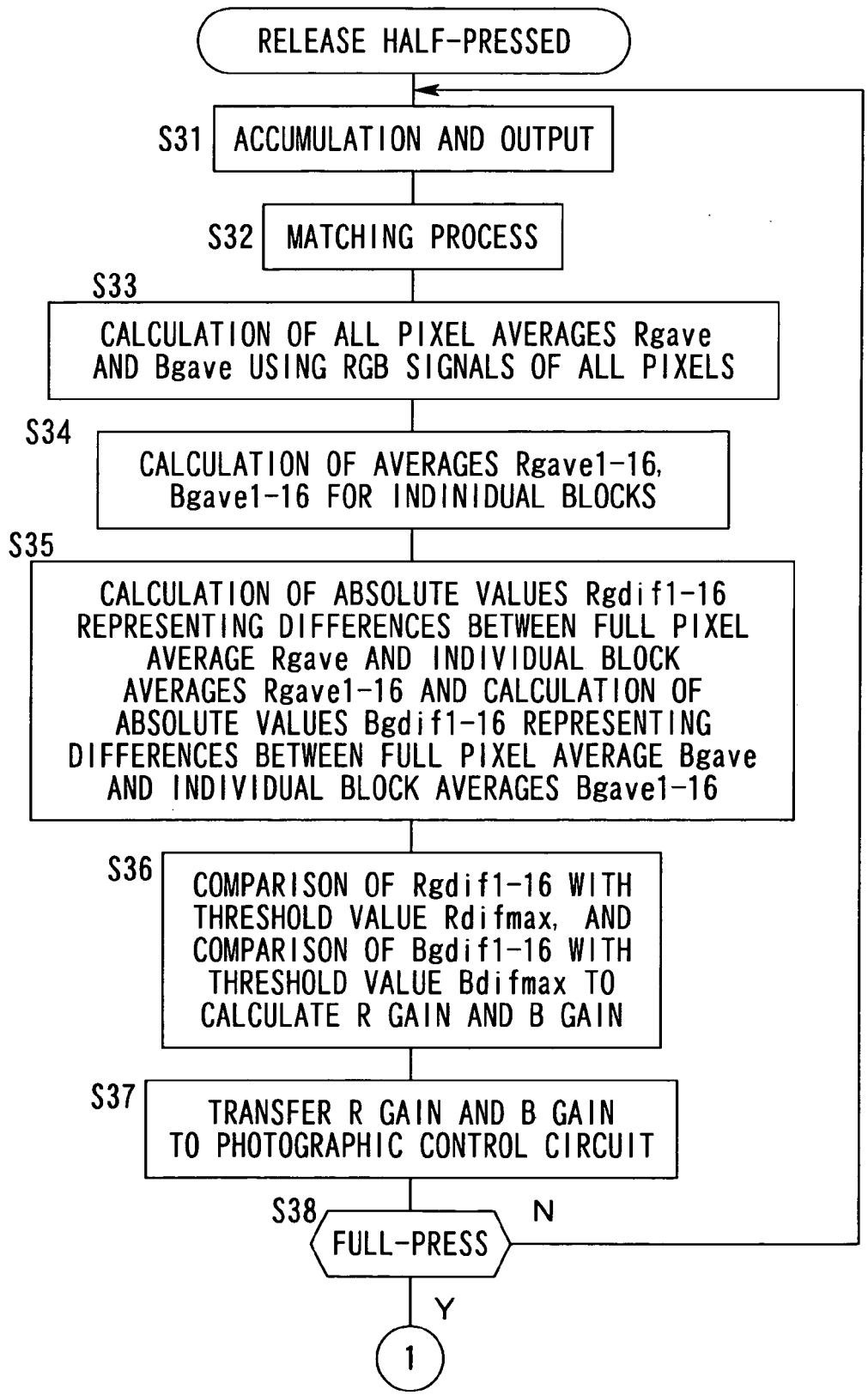
FIG. 8 is a flowchart illustrating another program that is started up with the half-press switch.

Next, the procedure that is taken to calculate the R gain and the B gain to be utilized for white balance adjustment based upon the results of the scene analysis is explained in reference to the flowchart in FIG. 8. In step S31, electrical charges achieved by the subject light received at the image capturing device for scene analysis 86 are accumulated over a specific length of time, and then the RGB image data for scene analysis are sequentially output to the scene analyzing circuit 10. In step S32, matching processing, in which the difference in the color characteristics between the image capturing device for scene analysis 86 and the image capturing device for photographing 73 is performed. The matching processing may be achieved through processing in which matrix calculation is performed for a matrix constant of, for instance, 3×L (L≧3) and raw RGB data, for instance.

In step S33, using the RGB signals (brightness values) corresponding to all the 480 pixels, an R gain full pixel average value Rgave and a B gain full pixel average value Bgave are calculated. The method for calculating the R gain and the B gain using the individual brightness values indicated by the RGB signals is of the known art, and therefore its explanation is omitted. In step S34, R gain block average values Rgave1~Bgave16 and the B gain block average values Bgave1~Bgave16 for the 16 individual blocks B11~B44 are calculated.

Then the operation proceeds to step S35, in which absolute values Rgdif1~Rgdif16 of the gain differences between the R gain full pixel average value Rgave and the R gain block average values Rgave1~Rgave16 and absolute values Bgdif1~Bgdif16 of the gain differences between the B gain full pixel average value Bgave and the B gain block average values Bgave1~Bgave16 are calculated based upon the following equation.

$$Rgdif[i] = |Rgave - Rgave[i]| \quad (2)$$

$$Bgdif[i] = |Bgave - Bgave[i]| \quad (3)$$

Here, i represents an integer within the range of 1~16.

In step S36, each of the absolute values Rgdif1~Rgdif16 of the gain differences is compared with a threshold value Rdifmax and each of the absolute values Bgdif1~Bgdif16 of the gain differences is compared with a threshold value Bdifmax. Based upon these comparisons, the R gain and the B gain for white balance are determined as described below.

(1) If the absolute values Rgdif1~Rgdif16 of the gain differences are all smaller than the threshold value Rdifmax, the R gain full pixel average value Rgave is selected as the R gain. If the absolute values Bgdif1~Bgdif16 of the gain differences are all smaller than the threshold value Bdifmax, the B gain full pixel average value Bgave is selected as the B gain.

(2) If any of the absolute values. Rgdif1~Rgdif16 of the gain differences is equal to or larger than the threshold value Rdifmax, the blocks having absolute values indicating gain differences smaller than the threshold value Rdifmax are selected, and the average value calculated based upon the total of the absolute value(s) Rgdif(i) of the gain difference(s) corresponding to one or a plurality of such blocks, is set as the R gain. If any of the absolute values Bgdif1~Bgdif16 of the gain differences is equal to or larger than the threshold value Bdifmax, the blocks having absolute values indicating gain differences smaller than the threshold value Bdifmax are selected, and the average value calculated based upon the total of the absolute value(s) Bgdif(i) of the gain difference(s) corresponding to one or a plurality of such blocks, is set as the B gain.

In step S37, the R gain and the B gain thus calculated are transferred to the photographic control circuit 21. The control circuit 21 then stores the R gain and the B gain in its memory. Subsequently, the operation in steps S31~S37 are repeated until the full-press button is operated in step S38.

When the full-press button 12 is operated, the quick return mirror swings upward and the program with the photographing sequence illustrated in FIG. 7 is started up. In step S21, a light reception signal is accumulated at each pixel in the image capturing device 73, and when the accumulation is completed, the accumulated electrical charges at the pixels are sequentially output. In step S22, the image data thus sent out are processed at the analog signal processing circuit 22 and are then converted to digital image data at the AD conversion circuit 23 before they are input to the image processing circuit 24. Next, the operation proceeds to step S23, in which white balance adjustment is performed for the image data by using the R gain and the B gain calculated in advance at the scene analyzing circuit 10 and stored in memory. It is to be noted that the image processing circuit 24 performs other types of image processing such as γ control using the gradation curves and the contour compensation.

Figure 9:
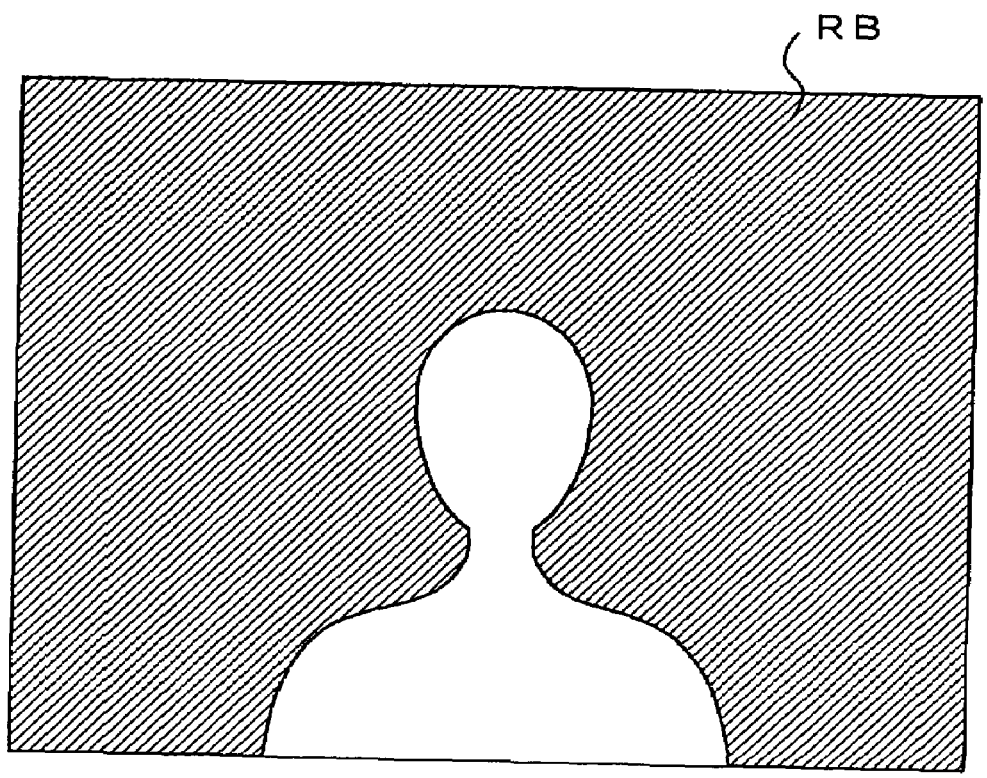
FIG. 9 shows a person against a red background.

As described above, when the half-press switch 11 is operated, the R gain and the B gain for white balance adjustment are calculated at the scene analyzing circuit 10, which are then transferred to the control circuit 21 to be stored in its memory in this embodiment. The calculation of the R gain and the B gain is executed repeatedly while the half-press switch is being operated so that the memory contents at the memory are overwritten with the latest data. Then, when the full-press switch 12 is operated and the subject light forms an image at the photographic image capturing device 73, the image capturing device 73 accumulates electrical charges achieved by the subject light over a specific length of time and sequentially outputs them. The image processing circuit 24 performs white balance adjustment using the R gain and the B gain that are stored in memory in advance on the image data. Thus, it is not necessary to calculate the R gain and the B gain for white balance adjustment by using the photographic image data themselves, whose volume is very large, so that the length of time required for white balance adjustment can be reduced. In addition, in a scene with a person against a red sign RB as a background as illustrated in FIG. 9, white balance adjustment can be achieved by excluding the area that is predominantly red so that the color of the persons skin and the like can be expressed more faithfully.

While the analyzing circuit 10 and the control circuit 21 are illustrated separately in FIG. 2, the present invention is configured so that the programs in FIG. 5 and FIG. 7 or the programs in FIG. 5 and FIG. 8 are executed by a single microprocessor.

It is to be noted that the gradation curve and the R gains and the B gains for white balance adjustment may be calculated at the scene analyzing circuit 10 and transferred to the control circuit 21 for accumulation so that both the high quality image processing using the gradation curve and the white balance adjustment are executed using these parameters.

In addition, in the explanation given above, the gradation curve, and the R gain and the B gain are calculated at the analyzing circuit 10 based upon the image data from the image capturing device for scene analysis 86 to be transferred in advance to the photographic control circuit 21 for accumulation. However, white balance adjustment may be achieved in the following manner, instead. Based upon the results of scene analysis, a block in which the absolute value of the gain difference is smaller than the threshold value is selected and the information related to the position of the block is transferred to the control circuit 21. At the control circuit 21, the photographic image data within the area corresponding to the block positional information among the image data from the photographic image capturing device 73 are taken in from the image processing circuit 24 to calculate the R gain and the B gain for white balance adjustment. In other words, the scene analyzing circuit 10 only calculates the area corresponding to the image data required for calculating the R gain and B gain. By calculating in advance the image area at the photographic image capturing device 73 to be utilized for the image processing based upon scene analysis results obtained at the image capturing device for scene analysis 86 provided at a position adjacent to the position that is conjugate with the position of the image capturing device for photographing 73 in this manner, the image processing performed based upon the results of the scene analysis can be completed within a shorter period of time compared to the prior art, as in the embodiment described earlier.

In addition, the present invention is ideal for application in various other types of electronic still cameras and information recording apparatuses with a large number of pixels (e.g., one million pixels or more) in addition to single lens reflex type electronic still cameras.

Furthermore, in an electronic still camera or an information recording apparatus provided with at least a pair of image capturing elements each receiving a subject image that has been coloristically separated, a scene analysis may be performed by using the entirety of or a portion of the image data at one of the image capturing elements.

In this case, the scene analysis may be implemented by using the image data corresponding to a specific portion, with the number of pixels at the image capturing elements set equal to each other. While the explanation is given above on the gradation curve and the gains for white balance adjustment, image processing may be implemented using parameters other than these based upon the results of scene analysis.

What is claimed is:

1. A single lens reflex type electronic still camera, comprising:
   a viewfinder device to which a subject image passing through a taking lens is guided by a quick return mirror;
   a photographic image capturing device provided at a stage to the rear of the quick return mirror, that captures the subject image and outputs color image data;
   an analytic image capturing device provided at a position that is substantially conjugate with said photographic image capturing device relative to the taking lens, that receives light forming the subject image guided to said viewfinder device from the quick return mirror and outputs color image data for scene analysis;
   an arithmetic operation circuit that is supplied with the color image data for scene analysis output by said analytic image capturing device, and calculates in advance parameters including coefficients and gains to be utilized for image processing based upon the color image data for scene analysis; and
   an image processing circuit that performs image processing on the color image data output by said photographic image capturing device using the parameters calculated at said arithmetic operation circuit.

2. A single lens reflex type electronic still camera, comprising:
   a viewfinder device to which a subject image passing through a taking lens is guided by a quick return mirror;
   a photographic image capturing device provided at a stage to the rear of the quick return mirror, that captures the subject image and outputs color image data;
   an analytic image capturing device provided at a position that is substantially conjugate with said photographic image capturing device relative to the taking lens, that receives light forming the subject image guided to said viewfinder device from the quick return mirror and outputs color image data for scene analysis;
   an arithmetic operation circuit that is supplied with the color image data for scene analysis output by said analytic image capturing device, and calculates in advance parameters including coefficients and gains to be utilized for image processing based upon the color image data for scene analysis; and an image processing circuit that calculates parameters such as coefficients and gains to be utilized for various types of image processing based upon image data corresponding to at least a specific area among photographic image data output by said photographic image capturing device and performs image processing on the photographic image data using the parameters; and
   an analyzing circuit that performs scene analysis on the subject image based upon the color image data for scene analysis output by said analytic image capturing device and determines the specific area based upon results of the scene analysis.

3. An information recording apparatus comprising:
   at least a first image capturing device and a second image capturing device that output image data by capturing a subject image passing through a taking lens;
   an analyzing circuit that performs scene analysis on the subject image using image data output by, at least, either said first image capturing device or said second image capturing device; and
   an image processing circuit that performs image processing on image data output by, at least, either said first image capturing device or said second image capturing device based upon scene analysis results obtained at said analyzing circuit; wherein:
   said analyzing circuit calculates a gradation ($\gamma$) curve based upon brightness values in the image data for scene analysis; and
   said image processing circuit corrects photographic image data based upon the gradation curve.

4. An information recording apparatus according to claim 3, wherein:
   said image capturing device utilized for scene analysis is divided into a plurality of areas each having a plurality of pixels receiving the subject image and said analyzing circuit calculates the gradation curve based upon image data for scene analysis output from the plurality of areas.

5. An information recording apparatus comprising:

at least a first image capturing device and a second image capturing device that output image data including color information by capturing a subject image passing through a taking lens;

an analyzing circuit that performs scene analysis on the subject image using image data output by, at least, either said first image capturing device or said second image capturing device; and an image processing circuit that performs image processing on image data output by, at least, either said first image capturing device or said second image capturing device based upon scene analysis results obtained at said analyzing circuit; wherein:

the image data for scene analysis output by said image capturing device for scene analysis contain RGB signals, said analyzing circuit calculates gains for white balance adjustment based upon the RGB signals and said image processing circuit corrects photographic image data based upon the gains for white balance adjustment.

6. An information recording apparatus comprising:

at least a first image capturing device and a second image capturing device that output image data by capturing a subject image passing through a taking lens;

an analyzing circuit that performs scene analysis on the subject image using image data output by, at least, either said first image capturing device or said second image capturing device; and an image processing circuit that performs image processing on image data output by, at least, either said first image capturing device or said second image capturing device based upon scene analysis results obtained at said analyzing circuit; wherein:

said image processing circuit calculates parameters including coefficients and gains to be utilized for various types of image processing based upon image data corresponding to, at least, a specific area among photographic image data output by said image capturing device for photographing; and said analyzing circuit determines the specific area based upon scene analysis results.

7. An information recording apparatus according to claim 3, wherein the information recording apparatus is an electronic still camera.

8. An information recording apparatus according to claim 7, wherein said first image capturing device and said second image capturing device have different numbers of pixels from each other, and image data output by an image capturing device having a smaller number of pixels are input to said analyzing circuit.

9. An information recording apparatus according to claim 5, wherein the information recording apparatus is an electronic still camera.

10. An information recording apparatus according to claim 9, wherein said first image capturing device and said second image capturing device have different numbers of pixels from each other, and image data output by an image capturing device having a smaller number of pixels are input to said analyzing circuit.

11. An information recording apparatus according to claim 6, wherein the information recording apparatus is an electronic still camera.

12. An information recording apparatus according to claim 11, wherein said first image capturing device and said second image capturing device have different numbers of pixels from each other, and image data output by an image capturing device having a smaller number of pixels are input to said analyzing circuit.

* * * * *